United States Patent [19]
Welker

[11] Patent Number: 5,307,830
[45] Date of Patent: May 3, 1994

[54] FLOW DISTRIBUTION METHOD AND APPARATUS REDUCING DOWNSTREAM TURBULENCE

[75] Inventor: Robert H. Welker, Washington, Tex.

[73] Assignee: Welker Engineering Company, Sugarland, Tex.

[21] Appl. No.: 63,873

[22] Filed: May 18, 1993

[51] Int. Cl.⁵ .............................................. F16K 47/02
[52] U.S. Cl. ...................................... 137/1; 251/118; 137/625.3; 138/39
[58] Field of Search ...................... 251/118; 137/625.3, 137/625.32, 1; 138/44, 39

[56] References Cited

U.S. PATENT DOCUMENTS

| | | | |
|---|---|---|---|
| 3,170,483 | 2/1965 | Milroy | 251/118 X |
| 3,271,845 | 9/1966 | Breher . | |
| 3,602,261 | 8/1971 | Brown . | |
| 3,630,229 | 12/1971 | Nagel et al. | 251/118 X |
| 4,085,774 | 4/1978 | Bramann . | |
| 5,014,746 | 5/1991 | Heymann . | |
| 5,070,909 | 12/1991 | Davenport . | |
| 5,074,333 | 12/1991 | Martin . | |

FOREIGN PATENT DOCUMENTS

| | | | |
|---|---|---|---|
| 224528 | 8/1910 | Fed. Rep. of Germany | 138/39 |
| 2810118 | 9/1979 | Fed. Rep. of Germany | 251/118 |

*Primary Examiner*—Arnold Rosenthal
*Attorney, Agent, or Firm*—Donald Gunn

[57] ABSTRACT

A flow distribution method and apparatus is set forth for reducing noise and vibration immediately downstream of a noise creating device such as a partially open or closed valve element. Partially open valve elements typically create a quarter moon distribution of highly turbulent flow. The present apparatus contemplates positioning of the inlet ends of a plurality of tubes immediately downstream within the flow region of the quarter moon area to gather the turbulent flow into a plurality of small tubes. The tubes are routed along a pipe section to different areas or points in the cross sectional area to discharge the flow. The several tubes collectively smooth the fluid flow through the structure. A method is also set forth. In one alternate embodiment, the downstream end of the pipe section is larger than the inlet end, and in another version, the individual tubes are provided with enlarged outlet ends.

20 Claims, 2 Drawing Sheets

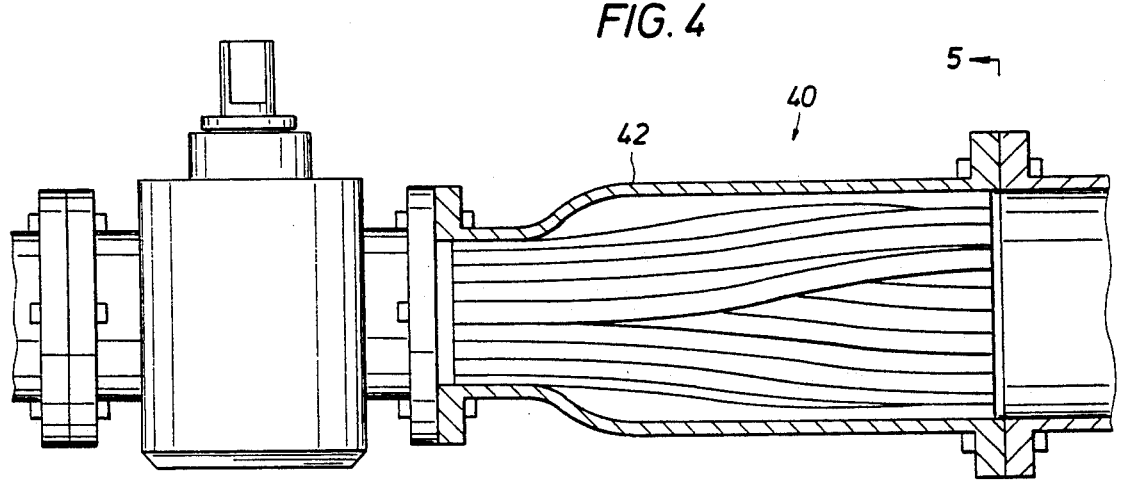
FIG. 4
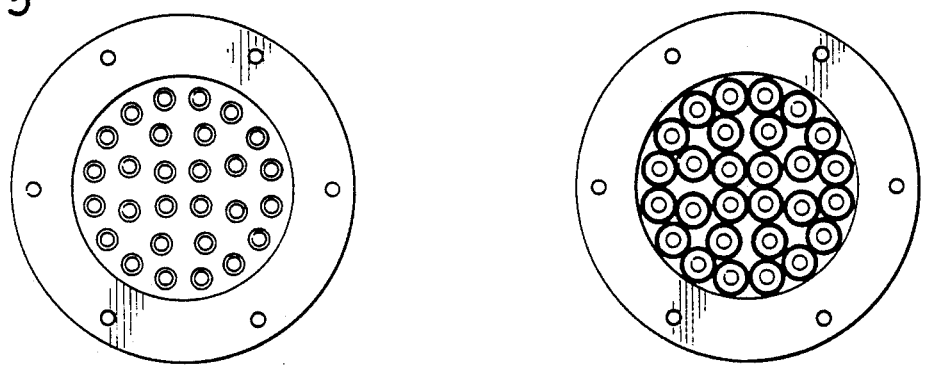
FIG. 5
FIG. 7
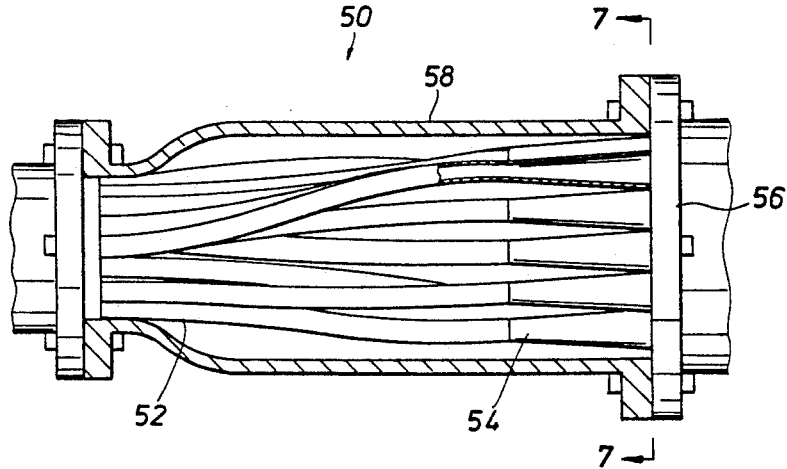
FIG. 6

FLOW DISTRIBUTION METHOD AND APPARATUS REDUCING DOWNSTREAM TURBULENCE

BACKGROUND OF THE DISCLOSURE

The present disclosure is directed to an apparatus which is used with devices creating turbulence in a pipeline. This apparatus reduces the downstream turbulence. In context, this refers to the fluid flow turbulence that might arise downstream of a ball valve in a natural gas pipeline. Consider a pipeline of a nominal 12 inch rating having a 12 inch ball valve supported on valve mounting trunnions. A valve operator is a mechanical device used to open and close the valve element. It is opened or closed by rotating the valve element so that the passage is at right angles to the axis of the pipeline, thereby closing the pipeline to fluid flow. On opening, rotation aligns the valve element passage. When the valve element is fully opened or fully closed, turbulence is not a problem. There is, however, a problem of turbulence on the transition between the fully opened or fully closed position. For instance, when the valve element is only opened slightly, there is a tremendous amount of turbulence created. This derives from the fact that the valve bore, rather than being fully opened, is very substantially closed except for a small quarter moon region at one side or the other depending on the rotation of the valve element and the extent of its opening. This is true of a ball valve and is also true of other types of valve mechanisms. There are gate valves, namely those devices which utilize a transverse gate guided in a set of tracks. The gate element may even be tapered to enable it to fit snugly in the tracks. Even in this instance, there typically will be a small crack or opening when the gate element is not seated fully. In other words, there is again a small region where fluid flow is permitted as the gate is moved toward the fully opened or fully closed position. There are other valves which have similar problems. Suffice it to say, at the partially opened state, turbulence is created downstream of a valve during transition between the fully opened and the fully closed positions. Further, a ball valve (for example) stays in the restricted position when used for modulating the flow.

One situation involving a valve creating downstream turbulence relates to a modulating valve. When a large supply line at very high pressure terminates at the edge of a city, the large, high pressure line connects at a sales station to one or more local distribution lines. A city of 400,000 people with typical industrial plants may have as many as 1000 modulating devices at various locations around the city. They typically are valves used to modulate or regulate the flow so that the local distribution lines (of smaller diameter) are provided with gas at a lower pressure for home, office and plant customers. In fact, the modulating valves will be left in a highly turbulent position for indefinitely long intervals. This creates turbulence without ceasing.

The valves just mentioned are merely exemplary of the problem. The problem derives primarily from the intermediate position of the moveable element which cooperates with the valve seat to plug fluid flow through the line. Suffice it to say, the entire flow pattern is impacted downstream of the valve. The turbulence can extent downstream as much as 20–100 diameters in length, referring to the diameter or nominal size of the pipeline. The turbulence downstream creates many difficulties. For one, it creates a tremendous amount of noise or vibration, or both. The noise and vibration tends to wear out the equipment in the near vicinity. Moreover, the turbulence created by the partially opened valve element fatigues the metal of the pipe, supporting structure for the valve, valve operators and the like. Valves of this sort are normally associated with other equipment. It is not uncommon to require several such valves at a pump station or product sales station. The pump station may involve millions of dollars of high pressure compressors and the like to boost the pressure to assure that the gas flow continues along the pipeline. Moreover, the vibrations do substantial harm to the adjacent buildings and structures. A typical pump station including a multi-horsepower power plant and turbine pump will normally be associated with several valves of this sort. This set of equipment is quite expensive to erect and maintain. If the valves create turbulence in the form of noise and vibration, it is expensive to deal with both the noise and the vibration in the immediate vicinity. This require substantial damping and other vibration suppression techniques.

An important feature of the present disclosure is the provision of a system which enables downstream reduction of noise and vibration. It is a device best installed serially in a pipeline on the downstream side of a valve, such as ball valves, gate valves and the like. Particularly in a high flow, high capacity line, the vibration can create difficulties for great distances downstream. This apparatus enables the reduction of noise immediately downstream. Moreover, it involves a structure which is installed at the downstream location so that maldistribution of fluid flow downstream of the partially opened or partially closed valve is remedied. It is a structure of which has a sufficient length to enable a nest of internal tubes to redistribute the fluid flow across the cross sectional area of the pipeline. A nest of parallel tubes is utilized. Their inputs are downstream of the turbulence creating valve. The tubes collectively have a cross sectional area which is approximately equal to or greater than the cross sectional area of the pipeline. The tubes are arranged so that the open ends of the tubes begin just downstream from the turbulence creating valve. With a distribution which can be described as mixed, the tubes are permitted between their open end inputs and theri outputs to redistribute the flow. For instance, the tubes collect the flow of turbulent fluid in a number of inlet passages, and redistribute that flow across the cross sectional area. The tubes are held in a housing. The housing has an enlarged, bell shaped central portion which is bigger in diameter than the nominal size of the pipeline. It is bigger to permit the tubes collectively to fit in serpentine fashion amongst other tubes to achieve flow distribution across the pipeline. The tubes are free of sharp bends or other obstructions in the tubes that might otherwise tend to create tube induced turbulence. They provide a streamline flow at the outlet ends. Thus, where the cross sectional area of the pipeline is divided into a number of tubes (represented by the number N, which is a whole number integer), the rearrangement of flows yields a smooth downstream flow which is substantially free of turbulence. A method is also set forth wich involves the arrangement of multiple tubes to redistribute the fluid flow and thereby reduce turbulence in the system.

DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 is an alternative embodiment shown in sectional view of the present invention where the tubes which provide the turbulence reducing transition connect to a larger diameter pipeline.

FIG. 5 is a sectional view taken along the line 5—5 of FIG. 4 showing details of construction of the ends of the tubes and the flange mounting of the structure;

FIG. 6 is a sectional view through another embodiment of the present structure showing a plurality of tubes where the tubes are flared at the output ends to provide an enlarged cross sectional area for reducing downstream turbulence;

FIG. 7 is sectional view along the line 7—7 of FIG. 6 showing details of construction of the output ends of the tubes;

DETAILED DESCRIPTION OF THE ILLUSTRATED EMBODIMENTS

Figure 1:
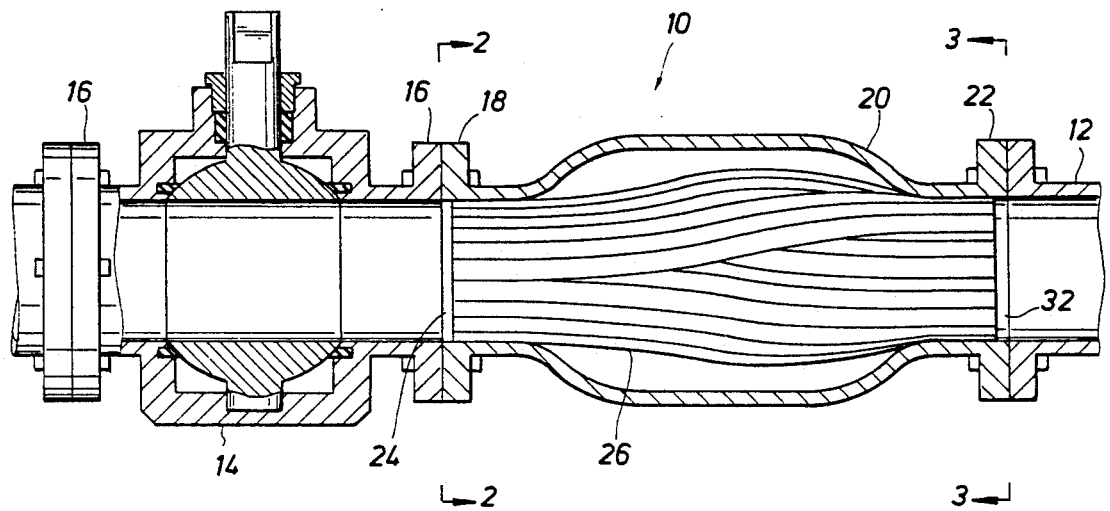
FIG. 1 is a sectional view through the invention of the present disclosure installed in a pipeline downstream of a turbulence creating ball valve.

Attention is now directed to FIG. 1 of the drawings where the numeral 10 identifies the noise suppressing apparatus of the present disclosure. The noise suppressing apparatus 10 is connected in a pipeline 12 downstream of a ball valve 14 which is connected in line with the pipeline by suitable mounting flanges 16. As will be understood, the valve and the pipe making up the pipeline are joined together in leak proof connection so that the pipeline provides a nominal ID for fluid flow. An example was given above where the nominal ID is a 12 inch pipeline. With the valve in the fully open position as illustrated in solid line FIG. 1, turbulence is not much of a problem at that opening. As would be further understood, the valve element in the valve 14 is rotated so that the valve element completely blocks fluid flow. In that condition, no fluid flows through the pipeline. The noise and vibration reducing apparatus at the present disclosure comes into place significantly when the valve is not fully opened nor closed; it is important when partial opening occurs.

The pipeline is assembled with a number of sections of pipe which are joined together in a well known fashion to connect serially with the valve 14 shown in FIG. 1. Immediately downstream, and connected at the flange on the downstream side of the valve 14, the present apparatus 10 is incorporated. Primarily, it comprises a flange 18 at the upstream end along with an elongate hollow pipe section 20. The pipe section 20 is smoothly streamlined so that it defines an enlarged cross sectional area at the central portions. The flange 18 is constructed in accordance with the industry standard so that the flange is able to match flanges common to the pipeline construction. This permits easy interconnection in the ordinary fashion. More specifically, the enlarged pipe section 20 has a smoothly faired portion which extends to an outer diameter greater than the diameter of the pipe. Approximately, the pipe is enlarged so that it has an internal cross sectional area of about 125-160 percent of the cross sectional area of the pipeline. There is no specific requirement for a particular increase; rather, the increase relates to the room necessary to permit the number of tubes to be routed and re-routed through the pipe section 20 as will be described. Just as the upper end flange 18 matches the flange 16 which is shown immediately adjacent to it, the pipe section 20 terminates at another flange 22 which again restores the pipe to the standard diameter at the flange connections so that it can connect with the pipeline 12. This derives from the fact that the flow is restored to a relatively smooth flow which is substantially free of turbulence downstream of this location.

Figure 2:
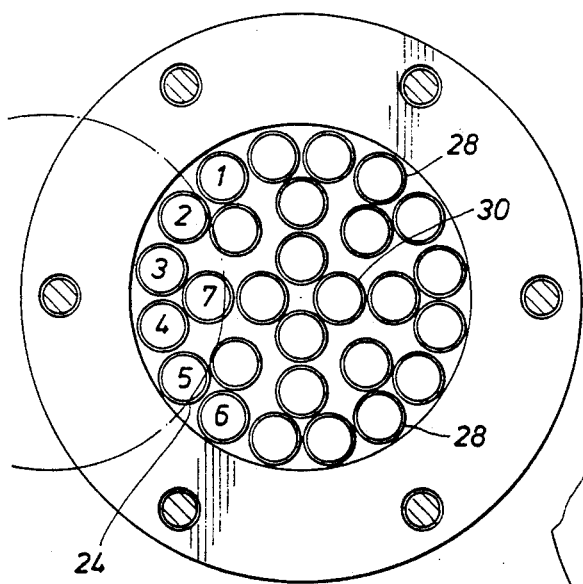
FIG. 2 is a sectional view along the line 2—2 through the structure of FIG. 1 showing the flange mounting connection of the present apparatus in the pipeline and also showing a plurality of tubes in the flanges where the several tubes intercept the turbulent and direct it into the numerous tubes.

At the pipe section 20, there is a transverse plate 24 which spans the pipe at the flange 18. The plate 24 is included to hold a number of tube ends. More particularly, a nest of tubes 26 connects between the two ends of the pipe section 20. Several tubes have ends at the left and right to admit the flowing fluid. It is desirable that the pipe be substantially open to fluid flow. To this end, a number of tubes 26 are positioned in the pipe section 20 and define the tube ends 28 better shown in FIG. 2 of the drawings. The tube ends are shown to be relatively uniform in diameter and have a common diameter. In actuality, this is a construction convenience. As desired, the tubes can be of different sizes. Generally, it is desirable that they are formed with a relatively circular cross section and are relatively straight. In other words, they are not constructed with sharp bends, and they are not normally crushed to a flat or oval shape. As shown in FIG. 2 of the drawings, the inlet ends 28 have a common size. It is however permissible and is quite successful to intersperse different size tubes. For instance, it is possible that the tube 30 at the very center be enlarged, or perhaps it can be made smaller to permit an additional set of tubes to be supported by the end plate 24. The plate 24 creates the appearance of a structure which blocks fluid flow. However, by selection of the appropriate tube diameter and by incorporation of the proper number of tubes, the cross sectional flow area can be substantially matched. Several tubes 26 which make up the bundle of tubes provide this equivalent cross sectional area.

Of particular importance to the present invention is the fact that the tubes are routed so that they redistribute the flow. Thus, the tube 30 does not necessarily extend straight through the pipe section 20 and emerge at precisely the same location at the opposite end of the bundle of tubes. Considering FIGS. 2 and 3 jointly, and particularly focusing on six of the tubes for purposes of description, it will be appreciated that opening or closing of the valve 14 creates a situation where fluid flow occurs in the form of a quarter moon at one edge or the other. Focusing now on the tubes 26-1 through the tube 26-6, these several tubes are the tubes that catch the flow that emerges when the valve element is only partly open. By merely cracking the valve element ever so slightly, the fluid flow through the valve element is intercepted by tubes 26-1 through 26-6 inclusive. That fluid flow is initiated at the quarter moon segment of the cross sectional area of the pipeline dictated by the shape of the valve element. As will be undertood, this creates a tremendous amount of turbulence, chatter, noise and detrimental vibration. When this occurs, the equipment can be damaged by the fatiguing results the noise and chatter. As it flows downstream, the fluid is intercepted by the six tube inlets shown in FIG. 2 of the drawings. The six tubes are not routed straigt through; rather, they are rearranged so that the flow is distributed more readily across the cross sectional area of the pipeline 12 to thereby reduce downstream turbulence. The turbulent fluid flow spilling through the valve element is thus intercepted at the six tubes just mentioned and that flow is smoothed. Generally speaking, smoothing happens within a specified number of diameters of the conduit. If the pipeline has a nominal diameter of one foot, it may take as much as 50-100 feet to smooth the flow and reduce the turbulence. Through the use of the present invention and through the use of tubes which are smaller than the nominal ID of the pipeline, redistribution can occur more rapidly. For instance, assume that the tubes shown in FIG. 2 of the drawings have a nominal ID of 2 inch. They can be only 4-8 feet in length and provide a smoothing effect. In other words, if each of the six specifically numbered tubes are 8 feet in length, that provides about 100 diameters to smooth turbulence in the smaller tubes. That would suggest a pipe section 20 having a nominal length of about 8 feet. Accordingly, and using this set of dimensions as an example, tubes of this length are able to internally smooth any turbulence occasioned in a particular small ID tube and provide an output which is relatively laminar inflow.

Figure 3:
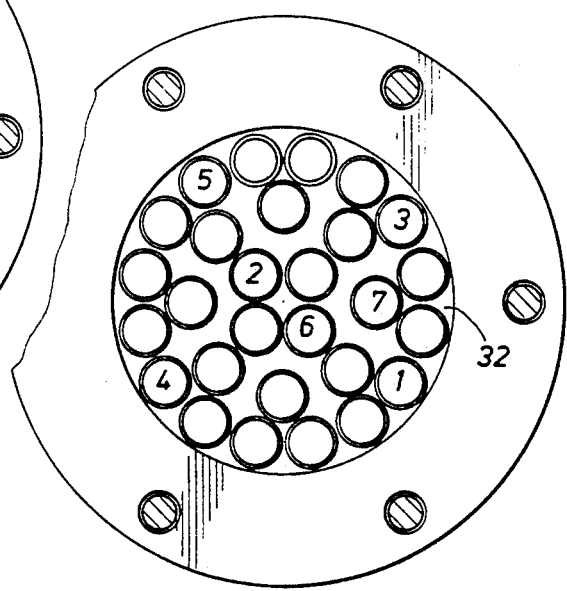
FIG. 3 is a sectional view along the line 3—3 of FIG. 1 showing how the tubes have rearranged the flow from the individual tubes so that the tubes provide an output at the downstream end of the present apparatus.

Going now to FIG. 3 of the drawings, it will be observed that the outlet ends are rearranged. More specifically, the outlet end of the pipe section 20 supports a transverse plate 32 which is similar in construction to the plate 24 at the inlet end. The plate 32 supports a number of tubes openings. Here, the six specifically identified tubes are rearranged. Thus, the tube 26-1 is located at an entirely different location as numerically represented in FIGS. 2 and 3. Note that the six tubes identified for purposes of this explanation are scattered across the cross-sectional area, thereby yielding a redistribution of the fluid flow. This is done for the six exemplary tubes. As will be understood, the unnumbered tubes are also rerouted so that they redistribute the flow so that the output from the pipe section 20 is a smooth flow. In the example illustrated, the number of tubes is variable meaning that the number N can be any number that is scaled appropriately. It would not be uncommon for N to be as small as about 15 in a small diameter pipeline, and perhaps as large as about 50 in a larger diameter pipeline. Increasing above 50 typically involves an excessive increase in complexity. In a very large pipeline, the diameter of the individual tubes can be increased so that N need not increase much beyond about 50. The pipe section 20 is a hollow housing which is filled with the numerous tubes 26. The tubes are gently deployed so that there are very modest curvatures in the several tubes. The region between the plates 24 and 32 is not necessarily pressure isolated. It is not important that the tubes connect with a perfect seal at the plates 24 and 32. Rather, it is desirable that the tubes connect with the plates 24 and 32 in such a fashion that the entire fluid flow through the pipeline is routed through the N tubes. The tubes are provided with fluid flow individually which may tend to cause modest vibration of the individual tubes. Thus, when the valve is first cracked open, the only flow directed into the several tubes is observed at the tubes 26-3 and 26-4. Those two tubes may tend vibrate while the other tubes have no flow and have no tendency to vibrate. Tube movement and vibration can be reduced or even avoided by filling the cavity of the pipe section 20 with a damping material. Any epoxy resin will suffice. It is preferably filled in the chamber 20 so that the cracks and crevices on the exterior of the tubes are filled. This serves as a sound deadening material. More importantly, it helps hold the tubes so that they are anchored along the full lengths of the tubes. This reduces vibration and chatter in the structure. More importantly, it hold the tubes in place and assures that they are not crushed as a result of crowding. As will be understood, there are many ways to route the N tubes so that they extend the length of the housing 20. For instance, it is not obligatory to terminate the six specifically identified tubes shown in FIG. 3 at the precise locations illustrated. What is important is the fact that the flow introduced through the six specifically identified tubes is redistributed across the full width of the cross sectional area. This assures that the flow is distributed, and assures also that the distributed flow through the tubes is able to emerge downstream substantially free of turbulence. Accordingly, there is a significantly variable redistribution of the tube outlets which can be permitted and yet which still accomplishes the intentions and purposes of the present structure.

As noted above, the pipe section 20 have approximately 25-60 percent extra cross sectional area at the central portions. This provides room so that the tubes can be routed so that they do not provide a straight through connection. A straight through connection is undesirable; it is desirable that the connections re deploy the tubes so that the discharge of fluid flow downstream is smooth when the valve is partially cracked open, when the valve is open perhaps 50%, and when the valve is open 100%. As will be understood, there is a random relationship of the tube outlets as shown in FIG. 3 of the drawings but there is a desire that, notwithstanding the randomness, the tube outlets provide the smooth laminar flow that is desired for quieted pipeline operation.

Attention is now directed to FIG. 4 of the drawings which shows an alternate embodiment which is identified by the number 40. The embodiment 40 differs in that the pipe sanction 42 is provided with an increase in cross sectional area and does not thereafter decrease. Again, it is not uncommon to utilize a valve or other device in conjunction with a different size pipe immediately downstream of the valve or device. For instance, if the upstream cross sectional area provides 100 square inches for fluid flow, the embodiment 40 might provide 110-130 square inches of cross sectional area on the downstream side. As before, the tubes redistribute the fluid in a pattern which is consistent with the teachings of the present disclosure. Therefore, the embodiment 40 is able to deliver the fluid flow so that fluid discharge downstream of the pipe sanction 42 is smooth and laminar. This is accomplished with the valve or device opening only slightly as, for instance, when it is only open 10%, also while open at 50% and also while open at 100%. As will be understood, fluid which is compressible will expand, thereby requiring a larger diameter pipeline. If there is a drop in pressure as might occur in a pressure regulator, the downstream side must be larger in diameter to accommodate the lower pressure for a specified fluid flow through the pipe section 42. The embodiment shown in FIG. 4 of the drawings provides such a feature.

To this end, FIG. 5 expands the description of the embodiment 40 so that the various tubes terminate at the flanges shown in FIG. 4, thereby permitting distribution of the fluid flow in the downstream area. The expansion of the gas may occur as a result of a pressure drop in the system. When the gas is discharged through the numerous tubes in the embodiment 40, the discharge side of the equipment accommodates the lower pressure.

Going now to FIG. 6 of the drawings, the numeral 50 identifies another embodiment which differs again as will be described. In this embodiment, the individual tubes are circular in construction. A particular tube 52 is shown in FIG. 6 of the drawings and is observed to have a flared tip 54. The tip 54 flares, thereby yielding a larger output area. It is circular in cross section along the length of the tube. The flared portion has an angle of divergence that is not more than about 5 or 6 degrees. This provides a larger output end. The output end again is anchored in the plate 56 in the same fashion as the embodiment 10. The flared portion enables a smoothing of turbulence and changes in delivery pressure if desired. Again, this requires an enlarged pipe section 58 having approximately 60% increase in cross sectional area.

As shown in FIG. 7 of the drawings, the several tubes terminate with an enlarged portion better shown in sectional view from the side in FIG. 6. This shows how the tubes provide an enlarged outlet. In some instances, it is desirable to redistribute the flow across the cross sectional area of the pipeline in the fashion of the embodiment 10 shown in FIG. 1 to also provide an arrangement for enlarged cross sectional area. Note in particular that FIGS. 1, 4 and 6 are similar in that the tubes are routed with minimal bends. The tubes are preferably circular along the length and they are preferably constructed so that no turbulence is created in the tubes. This requires that sharp bends are avoided and that the cross sectional area be approximately circular with minimal deformation to the tubes. The tubes are made of relatively thin wall material which makes it relatively easy to provide the flared end portions shown in FIG. 6 which terminate in the enlarged outlets as shown in FIG. 7. This again assures that the discharge from the tubes is distributed across the cross sectional area of the pipeline with minimal turbulence.

Figure 8:
FIG. 8 is a view showing a set of tubes having different diameters to enable the bundle of tubes to accommodate all the fluid flow.

Attention is now directed to FIG. 8 of the drawings. This view shows different sized diameter tubes. As will be understood, when the tubes have a relatively large and uniform diameter, there is substantial dead space between adjacent tubes. As will be recalled from FIG. 1 of the drawings, the tubes 26 are supported by the transverse plate 24. By the use of smaller tubes, the spaces between the larger tubes can be occupied thereby reducing the exposed surface area of the transverse plate 24. This enhances throughput, and also assists in redistributing the flow which would otherwise impinge on the transverse plate. It is desirable that the tubes collectively draw the entire flow without creating any flow blockage as a result of the transverse plate which support the tubes. This approach enhances the throughput of the device. The smaller and larger diameter tubes as shown in FIG. 8 can be distributed in any fashion appropriate in the bundle of tubes to obtain redistribution of the flow as depicted in FIGS. 2 and 3 previously discussed.

Figure 9:
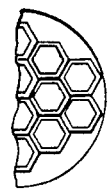
FIG. 9 is an alternate construction where the two ends have hexagonal shapes to enable reduction of the dead space between adjacent tubes.

The transverse plate is further reduced in exposure in this aspect shown in FIG. 9. This view shows tubes which are cylindrical along the length of the tubes but which terminate at hexagonal walls. It is relatively easy to convert the ends into the hexagonal shapes. Hexagonal tubes terminating together are easily connected together so that, effectively speaking, the transverse plate is reduced to a diminimus framework for holding the several tubes in. So to speak, the tube walls can nest together, being formed of a common dimension hexagon, thereby enabling all the tubes to collectively form the bundle of openings which make up the cylindrical opening in the pipe. As further shown in FIG. 9, the transverse plate is substantially reduced to a border or ring encircling the structure, thereby holding the multiple tubes together. If need be adjacent tubes can be attached to one another, for instance by sorter or brazing. As further shown in FIG. 9, there is a marginal area where the common dimension hexagons do not fit in the circle which confines them. This defines the border which can be perforated and support smaller tubes of the sort mentioned with regard to FIG. 8 of the drawings.

In all the embodiments, the individual tubes are relatively small and have sufficient length as relatively circular shapes, so that turbulence suppression occurs in each of the tubes, and the discharges at the several ends deliver flow which collectively becomes laminar flow downstream of the present invention. This is true with regard to all the embodiments. As will be understood, turbulence is substantially suppressed. Moreover, the nature of the flow accommodates practically all turbulent conditions. In other words, the several tubes are able to suppress an extremely turbulent fluid flow upstream of the present invention. Turbulence is reduced substantially to zero so that substantially laminar flow is achieved in the pipeline.

Going specifically now to certain aspects of the present invention, one feature is that the equipment can be installed and left downstream of a noise creating device. If there is a tremendous level of turbulence downstream which turbulent flow is introduced into the numerous small tubes, the individual tubes may tend to vibrate, shake or oscillate. If this occurs, the space in the pipe sections on the exterior of the tubes can be filled with an epoxy resin to serve as a dampening material. This serves as a sound deadening material. It stops noise and vibration and protects the pipes or tubes to prevent excessive damage as a result of noise or vibration.

Manufacture of the tubes in the surrounding chamber can be done by placing the set of tubes in the chamber with gentle bends formed in the tubes. After all the tubes are in place, then the chamber is filled with sound deadening material so that vibrations in the tubes do not rattle the assembled device 10. An alternative process is to form the tubes of a pliable plastic material, route the tubes with gentle bends, and then fill the chamber with a ceramic or similar material. Then, on application of heat over an adequate interval, the plastic of the tubes can be melted out and the ceramic cured so that the finished product has a set of passages through it in accordance with the teachings of the disclosure, and the cured ceramic provides a durable and rugged turbulence reducing system.

While the foregoing is directed to the preferred embodiment, the scope thereof is determined by the claims which follow:

I claim:

1. A method of reducing turbulence in a pipeline downstream of a valve or turbulence creating device, the method comprising the steps of:
   a) positioning a set of non-parallel, elongate small tubes in the pipeline wherein each of the tubes has an inlet end downstream of the valve or turbulence creating device and an outlet end;
   b) locating the inlet ends of less than the set of tubes at a location downstream of the valve or other turbulence creating device so that such tubes intercept fluid flowing downstream of the valve or other device wherein such tubes intercept turbulent fluid flow in the region of maximum turbulence;
   c) routing such tubes within the pipeline so that the relative cross sectional position of each tube within the pipeline changes between the inlet end and the outlet end; and
   d) positioning the remainder of the set of tubes so that the inlet ends and outlet ends distribute the fluid flow across the cross sectional area of the pipeline downstream of the outlet ends of the tubes to provide a cumulative flow through the set of tubes sufficient to match pipeline flow capacity and wherein said tube outlet ends collectively provide fluid flow with reduced turbulence.

2. The method of claim 1 including the step of positioning the set of small elongate tubes in a flange terminated pipeline section supporting said small tubes and serially installing the section in the pipeline.

3. The method of claim 2 wherein the pipe section is constructed with tube support members at the inlet and outlet thereof and including the step of securing the tubes permanently in the pipeline flow path.

4. The method of claim 1 wherein the turbulence creating valve forms a quarter moon distribution of turbulent flow when partially opened, and including the step of positioning the inlet ends of less than the set of tubes aligned with the quarter moon distribution of fluid flow through the cross sectional area immediately downstream of the valve.

5. The method of claim 1 including the step of installing an elongate pipe section in the pipeline to support said set of tubes and routing the tubes in the installed pipe section so that the tubes redistribute fluid flow across the cross sectional area of the pipeline in a random fashion.

6. The method of claim 1 including the step of expanding the tubes near the outlet ends thereof so that outlet fluid flow from the tubes is permitted to expand.

7. A method of reducing turbulence downstream of a partially opened valve in a pipeline comprising the step of:
   a) positioning a valve in a pipeline wherein the valve has a fully open position which aligns a valve element and passage through said valve element with the pipeline, and wherein the valve element moves to a partially open position creating turbulence at a specific portion of the pipeline cross sectional area downstream of the partially open valve;
   b) positioning a plurality of non-parallel, elongate small tubes with the inlet ends thereof located in the specific portion of the pipeline cross sectional area so that turbulent fluid flow downstream of the partially open valve is directed into the plurality of small tubes; and
   c) routing the tubes along the pipeline so that the relative cross sectional position of each tube within the pipeline changes between the inlet end and the outlet end to thereby smooth the turbulent flow to laminar flow.

8. The method of claim 7 wherein said valve element has a circular passage extending therethrough and which, when aligned with the pipeline, provides substantial full gauge passage through the valve element approximately equal in cross sectional area to that of the pipeline, and wherein the valve element on opening and closing constricts the passage so that turbulent fluid flows through the valve element passage has the form of a quarter moon distribution in the cross sectional area of the pipeline, and including the step of positioning the plurality of elongate small tube inlet ends in the quarter moon distribution and wherein the outlet ends are distributed across the cross sectional area of the pipeline to thereby smooth turbulent flow to laminar flow.

9. The method of claim 8 wherein the aggregate cross sectional area of the plurality of small tubes approximates the cross sectional area of the pipeline at the inlet ends of the small tubes.

10. The method of claim 9 wherein the aggregate cross sectional area is increased over the inlet end cross sectional area.

11. For use with a turbulence creating valve or device creating turbulence in fluid flowing in a pipeline, a system for suppressing fluid flow turbulence comprising:
   a) an elongate pipe section adapted to be serially connected downstream of a turbulence creating device;
   b) a plurality of non-parallel, small tubes up to the number N, wherein N is a whole number positive integer, and
   c) means supporting said small tubes so that
      (1) inlet ends of said small tubes are positioned to intercept turbulent flow downstream of said turbulence creating device;
      (2) outlet ends of said small tubes are positioned to discharge the flow therefrom across the entire cross sectional area of the pipeline; and
      (3) the mid portions of said tubes are routed along said pipe section.

12. The apparatus of claim 11 wherein said pipe section incorporates connective flanges at the two ends thereof to enable connection serially in the pipeline.

13. The apparatus of claim 11 wherein said small tubes are supported by means extending transversely of the elongate pipe section at the inlet end of said small tubes.

14. The apparatus of claim 13 wherein said small tubes are supported by means extending transversely of the elongate pipe section at the outlet end of said small tubes.

15. The apparatus of claim 11 wherein said tubes form at least two sets of tubes having different diameters.

16. For use with a turbulence creating valve or device creating turbulence in fluid flowing in a pipeline, a system for suppressing fluid flow turbulence comprising:
   a) an elongate pipe section adapted to be serially connected downstream of a turbulence creating a device, the elongate pipe section having a central portion which is larger in diameter than the end portions thereof and the end portions are sized to connect serially in the pipeline;
   b) a plurality of small tubes up to the number N, wherein N is a whole number positive integer, and
   c) means supporting said small tubes so that
      (1) inlet ends of said small tubes are positioned to intercept turbulent flow downstream of said turbulence creating device;
      (2) outlet ends of said small tubes are positioned to discharge the flow therefrom across the entire cross sectional area of the pipeline; and
      (3) the mid portions of said tubes are routed along said pipe section.

17. The apparatus of claim 16 wherein said enlarged central portion is sufficiently enlarged to enclose the mid portions of said tubes.

18. The apparatus of claim 16 including vibration dampening material in said elongate pipe section on the exterior of said tubes.

19. The apparatus of claim 16 wherein said tubes are elongate cylindrical tubes along the length thereof and wherein the inlet ends thereof form nested hexagon openings.

20. The apparatus of claim 19 wherein said hexagon openings define an area of circular construction supported by a transverse plate and further including cylindrical tubes about the periphery of said transverse plate.

* * * * *